(12) United States Patent
Smith et al.

(10) Patent No.: US 8,418,953 B2
(45) Date of Patent: Apr. 16, 2013

(54) GAS TURBINE ENGINE NACELLE

(75) Inventors: Angus Roy Smith, Derby (GB);
Dimitris Arzoglou, Derby (GB)

(73) Assignee: Rolls-Royce PLC (GB)

( * ) Notice: Subject to any disclaimer, the term of this patent is extended or adjusted under 35 U.S.C. 154(b) by 486 days.

(21) Appl. No.: 12/496,832

(22) Filed: Jul. 2, 2009

(65) Prior Publication Data
US 2010/0019101 A1    Jan. 28, 2010

(30) Foreign Application Priority Data

Jul. 24, 2008  (GB) .................................. 0813483.5

(51) Int. Cl.
*B64D 33/02* (2006.01)

(52) U.S. Cl.
USPC ........................................ 244/53 B; 137/15.1

(58) Field of Classification Search ................ 244/53 B, 244/53 R, 62; 60/15.1, 15.2; 137/15.1, 15.2
See application file for complete search history.

(56) References Cited

U.S. PATENT DOCUMENTS

| | | | |
|---|---|---|---|
| 5,000,399 A | * | 3/1991 | Readnour et al. ........... 244/53 B |
| 5,369,954 A | | 12/1994 | Stuart |

FOREIGN PATENT DOCUMENTS

GB          2064005 A      6/1981

* cited by examiner

*Primary Examiner* — Timothy D Collins
*Assistant Examiner* — Nicholas McFall
(74) *Attorney, Agent, or Firm* — McCormick, Paulding & Huber LLP

(57) ABSTRACT

A nacelle for a gas turbine engine has an intake at the upstream end of the nacelle and an exhaust at the downstream end of the nacelle. The intake has, an intake lip and a diffuser. The diffuser has a main diffuser section and an optional shorter straight wall diffuser section. The main diffuser section is bounded by an inner wall of the nacelle, the inner wall curving in the airflow direction of the engine. On each longitudinal section containing the engine axis, at the downstream end of the main diffuser section the inner wall has a non zero curvature. Thus each circumferential position on the inner wall at the downstream end of the main diffuser section has a curvature defined by a respective radius of curvature. However, one or more of the radii of curvature differ from the others of the radii of curvature.

9 Claims, 2 Drawing Sheets

GAS TURBINE ENGINE NACELLE

CROSS REFERENCE TO RELATED APPLICATION

This application is entitled to the benefit of British Patent Application No. GB 0813483.5, filed on Jul. 24, 2008.

FIELD OF THE INVENTION

The present invention relates to a gas turbine engine nacelle and in particular to a turbofan gas turbine engine nacelle.

BACKGROUND OF THE INVENTION

A turbofan gas turbine engine nacelle intake is required to supply the fan of the turbofan gas turbine engine with favourably conditioned air during all operational conditions of the turbofan gas turbine engine, irrespective of the aircraft environment and aircraft attitude, whether the aircraft is in flight or on the ground. The nacelle intake may also be required to absorb noise generated by the gas turbine engine.

FIG. 1 is a partially cut away view of a turbofan gas turbine engine having, in axial flow series, an intake 12, a fan section 14, a compressor section 16, a combustion section 18, a turbine section 20 and an exhaust 22. The fan section 14 comprises a fan disc 24 carrying a plurality of circumferentially spaced radially extending fan blades 26. The fan disc 24 and fan blades 26 are surrounded by a fan casing 28. The fan casing 28 is mounted from the core casing 30 by a plurality of radially extending fan outlet guide vanes 32. The fan section 14 is driven by a turbine in the turbine section 20 via a shaft (not shown). The compressor section 16 is driven by a turbine in the turbine section 20 by a shaft (not shown). The whole of the turbofan gas turbine engine 10 is placed within a nacelle 34.

FIG. 2 is an enlarged vertical longitudinal cross-section, containing the engine axis X, through the intake of the turbofan gas turbine engine nacelle shown in FIG. 1. The nacelle 34 has an intake 12 at its upstream end and an exhaust 25 at its downstream end. The nacelle 34 intake 12 comprises, in flow series, a flared intake lip 36, an intake throat 38 and a diffuser 40 upstream of the fan section 14 of the turbofan gas turbine engine 10. The intake lip 36 forms a contraction for the supply of air to the intake throat 38. The diffuser 40 is arranged to diffuse the air from the intake throat 38 to the fan section 14. Generally the nacelle is constructed from a number of separate cowls, the front inlet cowl providing the intake lip and the diffuser.

The intake lip 36 has an inner surface and an outer surfaces. The highlight H is a closed loop running around the intake lip, and defines the boundary between the lip inner and outer surfaces. In FIG. 2 the highlight H is viewed edge on and is indicated by a solid line.

Travelling downstream from the highlight H along the inner wall of the nacelle on a longitudinal section, the downstream end of the intake lip 36 is reached when the tangent to the inner wall becomes 90° relative to tangent to the wall on the same section at the highlight. The position of the intake throat 38 can be taken to be the downstream end of the inner intake lip and the upstream end of the diffuser 40.

The diffuser 40 has a main diffuser section in which the inner wall curves in the airflow direction (as well as curving, of course, around the circumference of the diffuser) from the intake throat 38 towards the fan section 14. At the front flange of the fan casing 28, the downstream end of the curved inner wall then joins, with tangency matching, to the inner wall of the fan casing 28.

Optionally (and not shown in FIG. 2), the diffuser section may have at its downstream end a relatively short section in which, on the longitudinal section, the inner wall is straight (i.e. uncurved) in the airflow direction. This straight section of inner wall is tangency matched at its front end to the inner wall of the main diffuser section and at its rearward end to the inner wall of the fan casing.

A problem with known diffusers, however, is that they may not sufficiently reduce flow pressure asymmetries at the fan face. Such asymmetries can cause the fan to operate away from its optimum operating point and hence there is a loss of efficiency.

SUMMARY OF THE INVENTION

Accordingly, a first aspect of the present invention provides a nacelle for a gas turbine engine, the nacelle having an intake at the upstream end of the nacelle and an exhaust at the downstream end of the nacelle, and the intake having, in flow series, an intake lip and a diffuser;

wherein the diffuser has a main diffuser section that is bounded by an inner wall of the nacelle, the inner wall curving in an airflow direction of the engine and, on each longitudinal section containing the longitudinal axis of the nacelle, at the downstream end of the main diffuser section the inner wall having a curvature, whereby each circumferential position on the inner wall at the downstream end of the main diffuser section has a curvature defined by a respective radius of curvature; and one or more of said radii of curvature differs from the others of said radii of curvature.

In known nacelles, the radii of curvature at the downstream end of the main diffuser section are all equal to each other. However, by having different radii of curvature at different circumferential positions, it is possible to reduce flow asymmetries.

Preferably, the radii of curvature vary smoothly around the circumference of the inner wall. The ratio of the largest radius of curvature to the smallest radius of curvature is preferably at least 2, and may be at least 5, 10 or 20.

The diffuser may comprise a straight wall section upstream of the main diffuser section.

A further aspect of the invention provides a gas turbine engine including a nacelle according to the first aspect.

Another aspect of the invention provides a method of designing a nacelle for a gas turbine engine including the steps of:

defining an initial geometry for a nacelle, the initial geometry providing an intake at the upstream end of the nacelle and an exhaust at the downstream end of the nacelle, wherein the intake has, in flow series, an intake lip and a diffuser, the diffuser having a main diffuser section that is bounded by an inner wall of the nacelle, the inner wall curving in an airflow direction of the engine and, on each longitudinal section containing the longitudinal axis of the nacelle, at the downstream end of the main diffuser section the inner wall having a curvature, whereby each position around the circumference of the inner wall at the downstream end of the main diffuser section has a curvature defined by a respective radius of curvature;

altering one or more of said radii of curvature; and adjusting the inner wall at regions neighbouring each altered radius of curvature to smoothly blend the inner wall at each altered radius of curvature to unadjusted parts of the inner wall further removed from the altered radius of curvature to obtain an altered geometry for the nacelle. Typically, the defining, altering and obtaining steps are performed on a computer system. Thus, the method can be used to design a nacelle according to the first aspect.

Typically, in the obtaining step, the inner wall at regions neighbouring each altered radius of curvature is also adjusted to smoothly vary the radii of curvature around said circumference.

In the initial geometry, around the circumference of the inner wall, all the radii of curvature may be identical. In the altered geometry, around the circumference of the inner wall, the radii on curvature may be controlled such that the ratio of the largest radius of curvature to the smallest radius of curvature is preferably at least 2, and may be at least 5, 10 or 20.

A further aspect of the invention provides a method of producing a nacelle for a gas turbine engine, including the steps of: designing a nacelle according to the method of the previous aspect; and manufacturing a nacelle having the altered geometry.

DETAILED DESCRIPTION OF THE PREFERRED EMBODIMENTS

The intake has, in flow series, an intake lip 51, a main diffuser section 52 and a short straight wall diffuser section 53. The boundaries between these parts of the intake are indicated by dotted lines. The inner wall 54 of the nacelle curves in the airflow direction of the main diffuser section, but is straight in the straight wall diffuser section. The inner wall at the upstream end of the straight wall diffuser section is tangency matched to respectively the curved inner wall of the main diffuser section. The downstream end of the straight wall diffuser section abuts the front flange of the fan casing (not shown).

The curvature of the inner wall 54, in the longitudinal section, at the downstream end of the main diffuser section 52 is illustrated schematically by the dashed circle C of radius R. Each circumferential position around the downstream end of the main diffuser section has a curvature defined by its respective radius of curvature R. A large R represents low curvature and a small R a high curvature.

Figure 1:
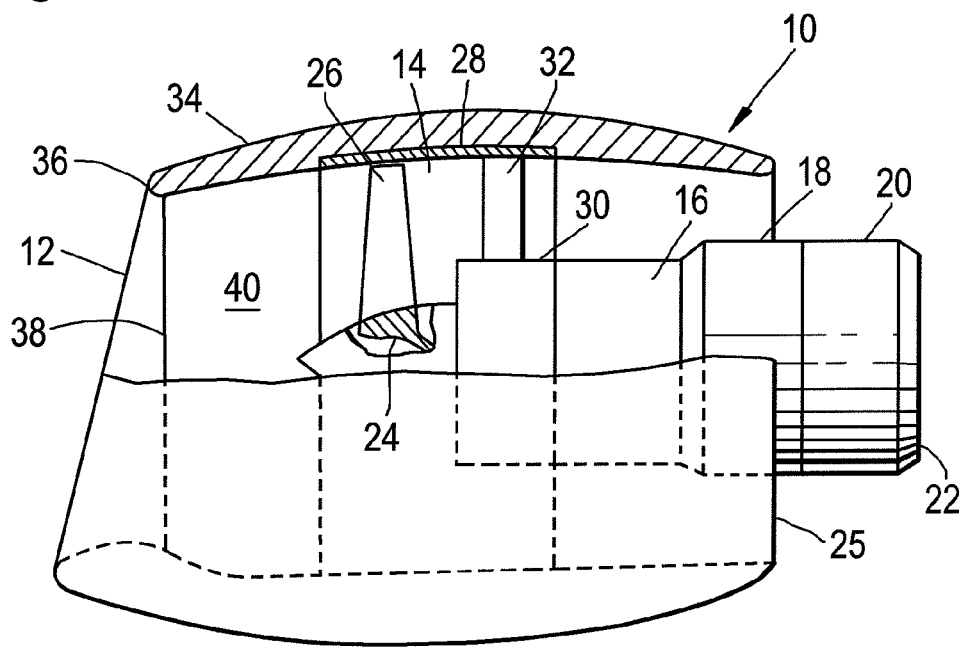
FIG. 1 is a partially cut away view of a known turbofan gas turbine engine.
Figure 2:
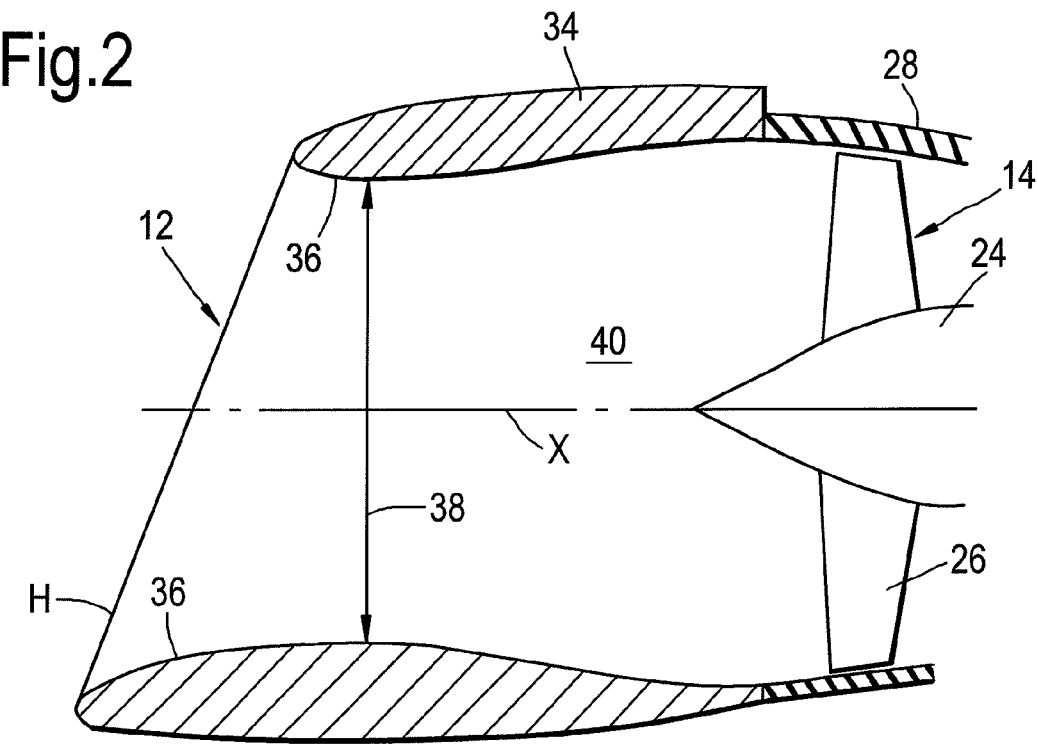
FIG. 2 is an enlarged vertical longitudinal cross-section, containing the engine axis X, through the intake of the turbofan gas turbine engine nacelle shown in FIG. 1.
Figure 3:
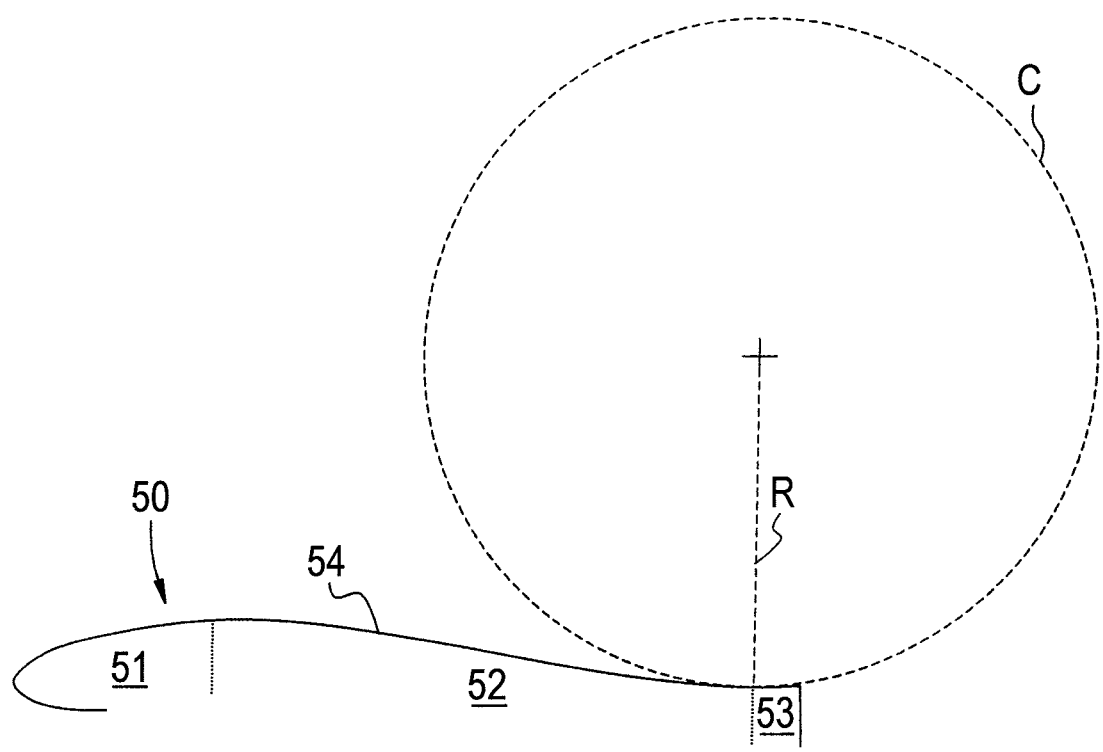
FIG. 3 shows a section through an intake at the keel position of a nacelle on a longitudinal cross-section containing the engine axis.

The intake lip shown in FIG. 3 represents a geometry for the nacelle, resulting, for example, from an initial nacelle design procedure. Typically, the initial nacelle design procedure sets all the radii of curvature R around the circumference of the downstream end of the main diffuser section equal to each other with a value corresponding or close to the radius of the front face of the fan section (not shown).

However, a next step in the design procedure is then to alter or control the radii of curvature R at one or more of the circumferential positions. Thus the design procedure introduces local diffuser curvature control.

After the alteration, R at a low curvature position may be at least 2 times, and preferably at least 5 times, the diameter of the front face of the fan section, whereas R at a high curvature position may be at most 0.5 times, and preferably at most 0.2 times, the diameter of the front face of the fan section.

Having specified the altered radii of curvature R, the next step in the design procedure is to adjust the inner wall of the nacelle at regions neighbouring the altered radii of curvature so that inner wall at each altered radius of curvature is smoothly blended to unadjusted parts of the inner wall further removed from the altered radius of curvature. This blending can be performed by methods known to the skilled person. Typically, an aim of the adjustments is to have a smooth variation in the radii of curvature around the circumference of the main diffuser section. The transitions between specified R values can be linear, or controlled by appropriate non-linear expressions as a function of circumferential location.

By having different curvatures at different circumferential positions, it is possible to reduce, in particular, flow asymmetries. For example, it has been found that the curvature at the downstream end of the main diffuser section can have a powerful effect on circumferential Mach numbers at the fan face. In some cases, tuning of radii of curvature has led to reductions in Mach number variation of up to a factor of six. This can lead to reduced fan forcing, potentially enabling the introduction of simpler, lighter and more efficient low pressure compressor systems.

Reductions in flow asymmetry at the fan face can also have benefits upstream. For example, the reductions can produce corresponding reductions in flow asymmetry in the front portion of the intake, which can reduce engine noise levels.

Local control of the radii of curvature also partially decouples diffuser design from the design of the intake as a whole duct. For example, diffuser profiles can be changed without changing intake length, or throat and highlight radii. More aggressive diffuser design is also enabled with local curvature control, potentially leading to shorter intakes.

In one embodiment, a conventional, positively scarfed intake is adjusted to provide an intake in which the radius of curvature is set at around two fan diameters at the crown and at around half a fan diameter at the keel. The local curvatures counter the effect of bulk flow coming in from below the engine centreline. The high keel curvature also enables the diffuser to be more aggressive, i.e. to perform more diffusion in the same length, but without loss of fan face flow uniformity when combined with a thickened intake lip at the keel.

In another embodiment, a conventional, negatively scarfed intake is adjusted in an opposite manner, so that the radius of curvature at the crown is reduced and the curvature end value at the keel is increased, to counter the effect of bulk flow coming in from above the engine centreline.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

What is claimed is:

1. A nacelle for a gas turbine engine, the nacelle comprising:
   an intake at the upstream end of the nacelle having, in flow series, an intake lip and a diffuser;
   wherein the diffuser has a main diffuser section that is bounded by an inner wall of the nacelle, the inner wall curving in an airflow direction of the engine and, on each longitudinal section containing the longitudinal axis of the nacelle, at the downstream end of the main diffuser section the inner wall having a curvature, whereby each circumferential position on the inner wall at the downstream end of the main diffuser section has the curvature defined by a respective radius of curvature, and one or more of said radii of curvature differs from the others of said radii of curvature, wherein around the circumference of the inner wall, a ratio of the largest radius of curvature to the smallest radius of curvature is at least 2; and an exhaust at a downstream end of the nacelle.

2. A nacelle according to claim 1, wherein said radii of curvature vary smoothly around the circumference of the inner wall.

3. A nacelle according to claim 1, wherein the diffuser further comprises a straight wall section upstream of the main diffuser section.

4. A gas turbine engine comprising:
a nacelle having an intake at the upstream end of the nacelle having, in flow series, an intake lip and a diffuser; wherein the diffuser has a main diffuser section that is bounded by an inner wall of the nacelle, the inner wall curving in an airflow direction of the engine and, on each longitudinal section containing the longitudinal axis of the nacelle, at the downstream end of the main diffuser section the inner wall having a curvature, whereby each circumferential position on the inner wall at the downstream end of the main diffuser section has the curvature defined by a respective radius of curvature; and where one or more of said radii of curvature differs from the others of said radii of curvature, wherein around the circumference of the inner wall, a ratio of the largest radius of curvature to the smallest radius of curvature is at least 2, and an exhaust at a downstream end of the nacelle.

5. A method of designing a nacelle for a gas turbine engine comprising the steps of:
defining an initial geometry for a nacelle, the initial geometry providing an intake at the upstream end of the nacelle and an exhaust at the downstream end of the nacelle, wherein the intake has, in flow series, an intake lip and a diffuser, the diffuser having a main diffuser section that is bounded by an inner wall of the nacelle, the inner wall curving in an airflow direction of the engine and, on each longitudinal section containing the longitudinal axis of the nacelle, at the downstream end of the main diffuser section the inner wall having a curvature, whereby each position around the circumference of the inner wall at the downstream end of the main diffuser section has the curvature defined by a respective radius of curvature; altering one or more of said radii of curvature; and adjusting the inner wall at regions neighbouring each altered radius of curvature to smoothly blend the inner wall at each altered radius of curvature to unadjusted parts of the inner wall further removed from the altered radius of curvature to obtain an altered geometry for the nacelle, wherein, in the altered geometry, around the circumference of the inner wall, the ratio of the largest radius of curvature to the smallest radius of curvature is selected to be at least 2.

6. A method of designing a nacelle according to claim 5, wherein the defining, altering and obtaining steps are performed on a computer system.

7. A method of designing a nacelle according to claim 5, wherein in the obtaining step the inner wall at regions neighbouring each altered radius of curvature is also adjusted to smoothly vary the radii of curvature around said circumference.

8. A method of designing a nacelle according to claim 5, wherein in the initial geometry all said radii of curvature are identical.

9. A nacelle for a gas turbine engine made in accordance with a method comprising the steps of:
defining an initial geometry for a nacelle, the initial geometry providing an intake at the upstream end of the nacelle and an exhaust at the downstream end of the nacelle, wherein the intake has, in flow series, an intake lip and a diffuser, the diffuser having a main diffuser section that is bounded by an inner wall of the nacelle, the inner wall curving in an airflow direction of the engine and, on each longitudinal section containing the longitudinal axis of the nacelle, at the downstream end of the main diffuser section the inner wall having a curvature, whereby each position around the circumference of the inner wall at the downstream end of the main diffuser section has the curvature defined by a respective radius of curvature; altering one or more of said radii of curvature; and adjusting the inner wall at regions neighbouring each altered radius of curvature to smoothly blend the inner wall at each altered radius of curvature to unadjusted parts of the inner wall further removed from the altered radius of curvature to obtain an altered geometry for the nacelle, wherein, in the altered geometry, around the circumference of the inner wall, the ratio of the largest radius of curvature to the smallest radius of curvature is selected to be at least 2.

* * * * *